United States Patent [19]

Ikeda et al.

[11] Patent Number: 4,922,269

[45] Date of Patent: May 1, 1990

[54] LIQUID JET RECORDING HEAD UNIT, METHOD OF MAKING SAME AND LIQUID JET RECORDING APPARATUS INCORPORATING SAME

[75] Inventors: Masami Ikeda, Tokyo; Hirokazu Komuro, Hiratsuka, both of Japan

[73] Assignee: Canon Kabushiki Kaisha, Tokyo, Japan

[21] Appl. No.: 327,383

[22] Filed: Mar. 23, 1989

Related U.S. Application Data

[63] Continuation of Ser. No. 251,971, Sep. 26, 1988, abandoned, which is a continuation of Ser. No. 935,092, Nov. 24, 1986, abandoned, which is a continuation of Ser. No. 739,715, May 31, 1985, abandoned.

[30] Foreign Application Priority Data

Jun. 11, 1984 [JP] Japan ............................... 59-118332

[51] Int. Cl.[5] .......................... G01D 15/16; B41J 3/04

[52] U.S. Cl. ................................ 346/140 R; 361/408; 361/413; 346/1.1; 346/139 C

[58] Field of Search .............. 346/140, 76 PH, 139 C, 346/1.1; 361/400, 404, 408, 413

[56] References Cited

U.S. PATENT DOCUMENTS

| | | | |
|---|---|---|---|
| 3,700,852 | 10/1972 | Ruggiero | 346/76 PH X |
| 3,958,254 | 5/1976 | Okabe | 346/139 C |
| 4,074,284 | 2/1978 | Dexter et al. | 346/140 R |
| 4,329,698 | 5/1982 | Smith | 346/140 |
| 4,345,262 | 8/1982 | Shirato | 346/140 |
| 4,350,448 | 9/1982 | Hanagata | 400/175 X |
| 4,429,321 | 1/1984 | Matsumoto | 346/140 |
| 4,499,478 | 2/1985 | Matsufusi | 346/140 |
| 4,499,480 | 2/1985 | Takatori | 346/140 |
| 4,500,895 | 2/1985 | Buck | 346/140 |
| 4,633,274 | 12/1986 | Matsuda | 346/140 R |
| 4,727,384 | 2/1988 | Tsuda | 346/140 R |

FOREIGN PATENT DOCUMENTS

| | | |
|---|---|---|
| 7728016 | 9/1977 | Fed. Rep. of Germany . |
| 3142121 | 6/1982 | Fed. Rep. of Germany . |
| 3237833 | 10/1982 | Fed. Rep. of Germany . |
| 57-69072 | 4/1982 | Japan . |
| 57-116665 | 7/1982 | Japan . |

*Primary Examiner*—Joseph W. Hartary
*Attorney, Agent, or Firm*—Fitzpatrick, Cella, Harper & Scinto

[57] ABSTRACT

A liquid jet recording head unit comprises a recording head, for forming flying liquid droplets which are discharged through an orifice by the action of energy generated by an energy generating member provided on a substrate and connected to an electrode on the substrate, and a support member having thereon an electrode for supplying an electrical signal to the energy generating member and a connector electrically connected to the electrode on the support member for electrically and mechanically connecting the recording head unit to a recording apparatus, wherein the electrode of the recording unit and the electrode of the support member are electrically connected to each other and the recording head is mechanically connected to the support member.

25 Claims, 7 Drawing Sheets

41

LIQUID JET RECORDING HEAD UNIT, METHOD OF MAKING SAME AND LIQUID JET RECORDING APPARATUS INCORPORATING SAME

This application is a continuation of application Ser. No. 251,971 filed Sept. 26, 1988, now abandoned, which in turn is a continuation of application Ser. No. 935,092, filed Nov. 24, 1986, now abandoned, which in turn is a continuation of application Ser. No. 739,715, May 31, 1985, now abandoned.

BACKGROUND OF THE INVENTION

1. Field of the Invention

The present invention relates to a liquid jet recording head for jetting liquid to form flying droplets to make a record.

2. Description of the Prior Art

A liquid jet recorder makes a record by discharging liquid such as ink from a nozzle of a recording head. This type of recorder has been warranted attention in that the noise generated during recording is negligible, it attains high speed recording and the record can be made on a plain paper without special treatment.

Among others, liquid jet recording methods disclosed in Japanese Patent Application Laid-Open No. 51875/1979 and West Germany DOLS No. 2843064 are unique compared with other liquid jet recording methods because thermal energy is applied to the liquid to produce a motive force for discharging droplets.

In the disclosed recording method, the liquid acted by the thermal energy causes a change of state with a rapid increase of volume, liquid is discharged from an orifice at an end of a recording head by a force due to the change of state to form flying droplets and the droplets are deposited on a record medium to form a record.

The liquid jet recording method disclosed in the West Germany DOLS No. 2843064, is not only effectively applied to a drop-on demand recording method but also allows easy implementation of a full-line type, high density multi-orifice recording head and hence it enables rapid formation of a high resolution and high quality image.

The recording head used in the above recording method comprises a liquid discharge unit including an orifice for discharging liquid and a liquid flow path having a heating unit by which a thermal energy for discharging droplets is applied to the liquid, and an electro-thermal converter for generating the thermal energy.

In the prior art recorder having a liquid jet recording head, wiring of the recording head extends on a substrate to a flexible wiring cable connected to a drive circuit which produces an electrical signal to drive the electro-thermal converter of the recording head. The connecting pads of the flexible cable for applying the electrical signal to the recording head have been connected to the wiring pads of the recording head by press-contact method, wire bonding method, soldering or thermal press-contact method, and thereafter the flexible cable is fixed to the recording head.

The substrate of the liquid jet recording head has one of different wiring and heat generating resistor patterns depending on an end product such as eight lines with 2.5 lines/mm for a desk top calculator printer or sixteen lines with 4 lines/mm for a facsimile machine.

FIG. 1 shows a structure of a prior art liquid jet recording head. Numeral 1 denotes a substrate, numeral 2 denotes electrodes through which electrical signals are supplied, numeral 3 denotes heat generating resistors which are electrothermal converters, numeral 4 denotes an area of a protection film which protects the electrodes and the heat generating resistors from liquid, and numeral 5 denotes a flexible cable for connecting the substrate to a drive circuit.

In the prior art liquid jet recording head, the wiring area 6 is large and hence the amount of the substrate material required for each head is large. Since the substrate is made of an expensive material such as Si, the increase of the cost of the recording head by the substrate is not negligible.

The increase of the size of the substrate by the unnecessary area causes the reduction of throughput in etching, sputtering or vapor deposition process and impedes mass-production.

Further, because the mask changes from product to product, the etching, sputtering or vapor deposition process is complex and yield is lowered due to misoperation.

Even in the unnecessary area, short-circuits and bridging of the wiring occur at the same probability as that in the necessary area. Thus, the unnecessary area causes the reduction of the yield.

SUMMARY OF THE INVENTION

It is an object of the present invention to provide an inexpensive liquid jet recording head which uses a minimum of expensive substrate material.

It is another object of the present invention to provide a liquid jet recording head which allows a high manufacturing yield and has a high reliability in manufacture.

It is another object of the present invention to provide a recording head which can be assembled by sub-elements and is applicable for mass-production of a multi-orifice type recording head.

It is another object of the present invention to provide a recording head which allows a large freedom of in taking out wiring from the recording head and in designing a head shape.

It is another object of the present invention to provide a liquid jet recording head for discharging record liquid from an orifice as flying droplets by applying a thermal energy to the record liquid by a heat generator arranged on a substrate, wherein a plurality of heat generators are formed on a continuous substrate and the substrate is divided to produce a number of heat generators.

It is another object of the present invention to provide a liquid jet recording head unit in which a recording head is formed by dividing a substrate on which a plurality of heat generators are mounted, major electrode leads of the recording head unit are arranged on a separate substrate member, the recording head is mounted on the separate substrate member, and the major electrode leads and the electrodes of are electrically connected.

DETAILED DESCRIPTION OF THE PREFERRED EMBODIMENTS

Figure 2A:
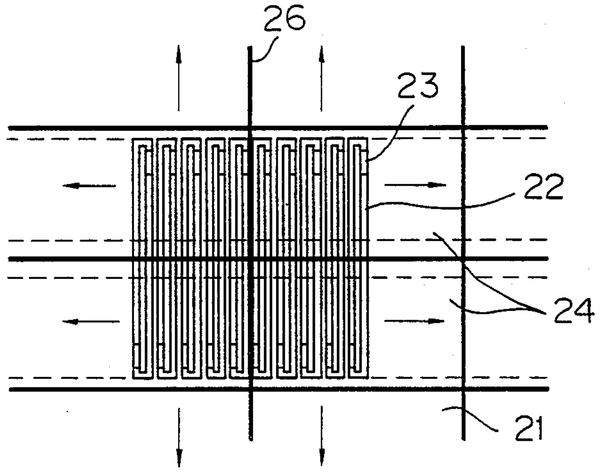
FIGS. 2(*a*) and 2(*b*) are plan views of recording head substrates of a recording head of the present invention, FIGS. 3(*a*) and 3(*b*) are perspective view of recording heads of the present invention.
Figure 2B:
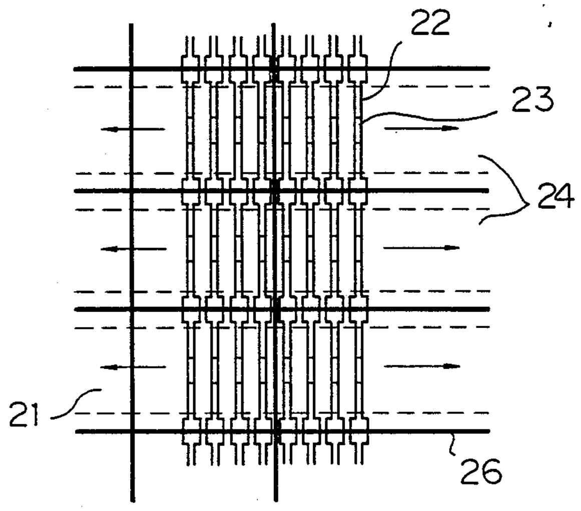

FIGS. 2(*a*) and 2(*b*) show head substrates. In FIG. 2(*a*), electrodes are folded and in FIG. 2(*b*), electrodes are not folded. Numeral 21 denotes a support made of a metal such as Ci, Al, Cu or Fe or a semiconductor such as Si. In the present embodiment, an insulative layer made of an oxide such as $SiO_2$ or $Al_2O_3$ is formed on the substrate to electrically isolate a heat generating element. The substrate may be made of an oxide such as $SiO_2$, glass or $Al_2O_3$, a nitride such as AlN, $Si_3N_4$ or BN or a carbide such as SiC or FeC.

A heat generator 23 and electrodes 22 for supplying a current thereto are formed on the substrate 21. A heat generating resistor of the heat generator is made of a boronide such $HfB_2$ or $ZrB_2$, a nitride such as TaN, AlN, TiN, HFN, or ZrN, a carbide such as SiC, TaC, WC or TiC or a high melting point metal such as Ta, W, Mo or Ti. A protection layer 24 for protecting the electrodes 22 and the heat generator 23 from the liquid are coated thereon. The protection layer may be made of an oxide such as $SiO_2$, $Ta_2O_5$, $Al_2O_3$, a nitride such as $Si_3N_4$ or AlN, a carbide such as SiC or a diamond-shaped carbon. The electrodes 22 may be made of electrically conductive material such as Al, Au, Cu, Ta, W, Mo, Ag or Fe. Numeral 26 denotes scribe lines along which the substrate is divided. They may be formed by a dicing saw, a diamond cutter, a scribing machine or a laser beam.

A pattern on the recording head substrate is a repetitive pattern so that each section has the same pattern as that of other sections. For those products which have different numbers of nozzles and the same nozzle pitch, the patterns can be taken out from the substrates of the same batch by merely changing the dividing length.

Figure 3B:
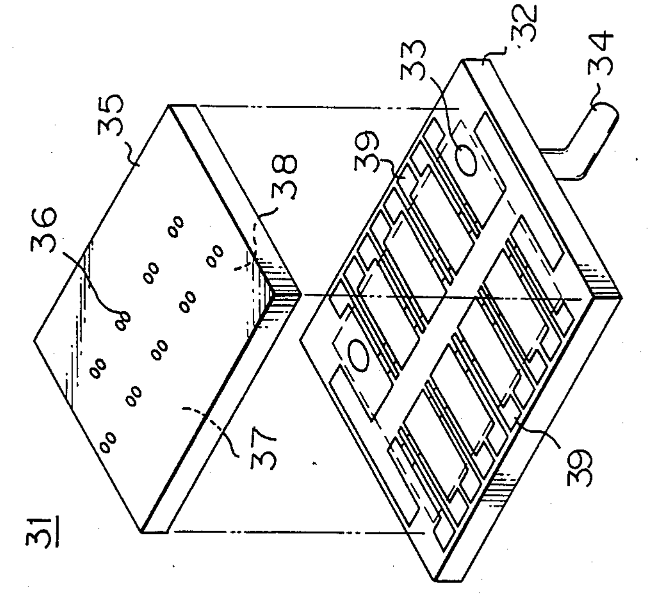
Figure 3A:
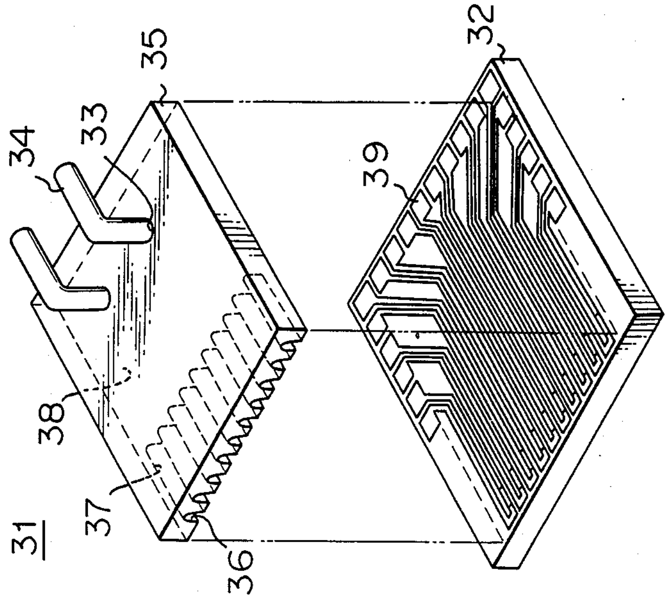

FIGS. 3(*a*) and 3(*b*) show perspective views of a liquid jet recording head with nozzles and a liquid chamber mounted on a substrate.

FIG. 3(*a*) shows an edge shooter type recording head having a discharge plane formed on an edge of the recording head, and FIG. 3(*b*) shows a side shooter type recording head having a discharge plane formed on a side of the recording head.

Numeral 31 denotes a recording head, numeral 32 denotes a substrate of the recording head, and numeral 33 denotes a liquid supply port to which a supply tube 34 is mounted and through which liquid is supplied to the recording head. The supply tube 34 is coupled to a liquid tank (not shown). Numeral 35 denotes a top plate for sealing the record liquid having formed therein a liquid chamber 38 for temporarily storing the liquid in the recording head, flow paths 37 through which the liquid is supplied to the heat generating element and orifices 36 through which the droplets are discharged toward a record medium (not shown).

The top plate 35 may be made of a material which is not modified by immersion in the record liquid for a long period and which is easy to be machined. For example, glass or ceramics such as almina is etched or ground. An anti-corrosion metal such as Au, Cu, SuS, Ni may be etched or electroformed. An organic resin may be molded or etched. A photosensitive resin or ceramics may be photolithographed.

The top plate 35, substrate 32 and supply tube 34 are bonded by adhesive material to form the liquid jet recording head.

The top plate 35 must be smaller than the substrate 32 so that an electrode take-out area 39, through which the recording head is electrically connected to an external circuit is exposed. Thus, when the substrate is to be divided, the size of the divided substrate must be larger than the total size of the top plate 35 and the electrode take-out area 39. The liquid chamber 38 must be in the area in which the electrodes are covered by the protection film.

Figure 4:
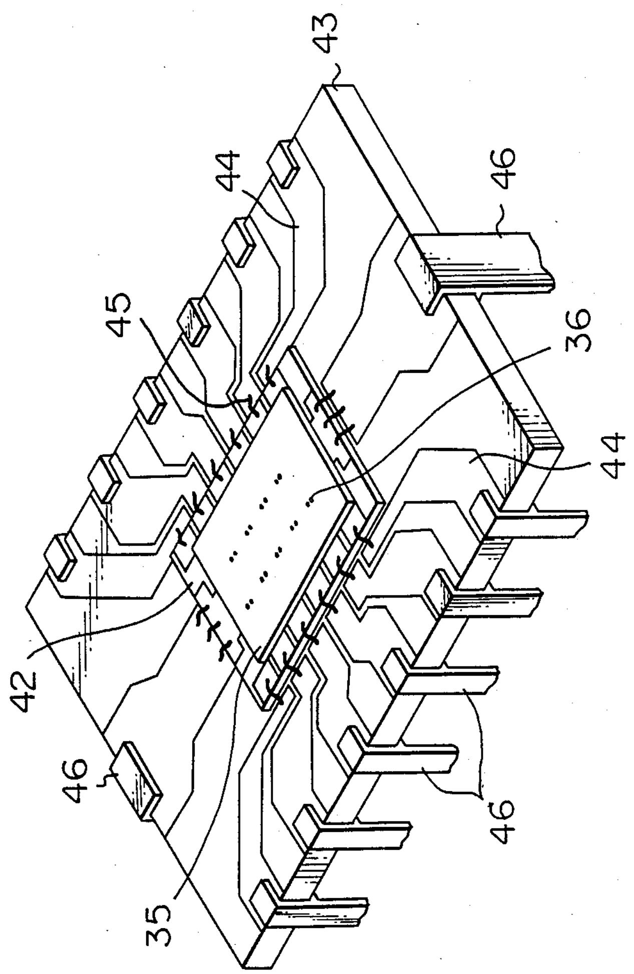
FIG. 4 is a perspective view of the recording head unit of the present invention, FIGS. 5(*a*), 5(*b*), 6(*a*) and 6(*b*) are sectional views of other embodiments of the recording head unit of the present invention.

FIG. 4 shows a perspective view of a recording head unit in which the liquid jet recording head shown in FIG. 3(*b*) is mounted on a separate substrate having separate wiring. Numeral 41 denotes the recording head unit which has the recording head 42 shown in FIG. 3(*b*) mounted on the substrate or support member 43 and which is electrically connected by electrode connection members 45. Numeral 46 denotes external electrodes to be connected to the external circuit in a printer.

The support member 43 may be made of an inorganic insulative substrate such as alumina, ceramics, SiC or glass, or a metal plate coated with an insulative material such as Denki-Kagaku Kogyo DENKA HITT plate, or Tokyo IC IMST substrate, or a printed circuit board or a flexible (polyester, glass epoxy, polyimide) substrate.

The electrodes 44 may be made of a highly conductive metal such as Au, Cu, Ag, Al, Fe or a conductive material such as conductive paste. It may be spin coated, vapor deposited, cladded and bonded, and then etched into a desired pattern, screen-printed and fired.

The members 45 for electrically connecting the recording head and the support member 43 are made of Al or Au and formed by wire bonding.

In this manner, the recording head unit of the present invention is formed.

Figure 5A:
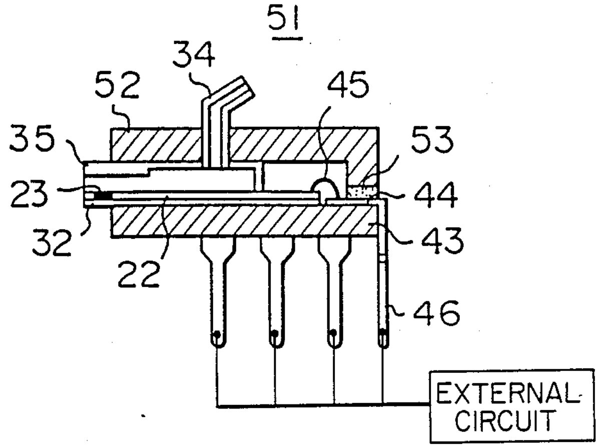
Figure 5B:
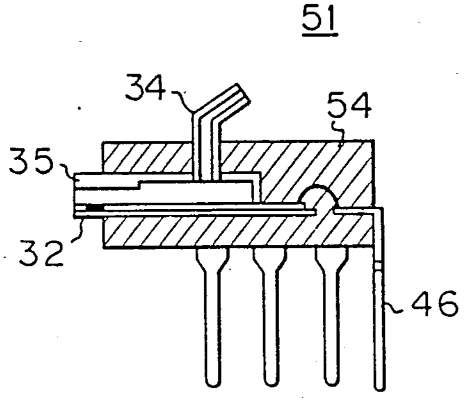
Figure 6A:
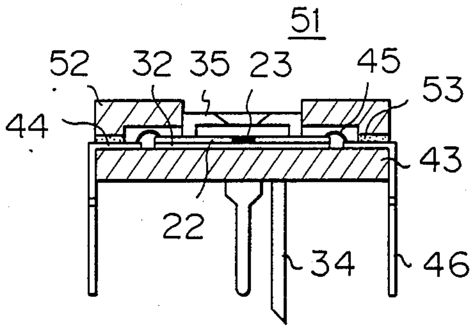
Figure 6B:
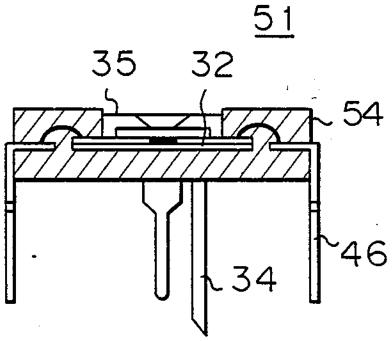

The durability and reliability of the recording head of the present invention are improved by protecting the electrical connection area. FIGS. 5 and 6 show embodiments thereof.

FIG. 5 shows an embodiment of the edge shooter type recording head unit and FIG. 6 shows an embodiment of the side shooter type recording head unit.

In FIGS. 5(*a*) and 6(*a*), a sealing member 52 is bonded to a top of a recording head unit 51 by adhesive material 53. The sealing member may be made of plastic, metal or ceramics.

FIGS. 5(*b*) and 6(*b*) show recording head units in which wirings of the recording head are completely covered by sealing materials 54. The electrodes of the recording head are directly bonded to the external connection electrode members 46 and then the entire assembly is resin-sealed.

The sealing material used in the perfect sealing may be fluidic and curable insulative material such as epoxy resin, phenol resin or silicone resin.

Figure 1:
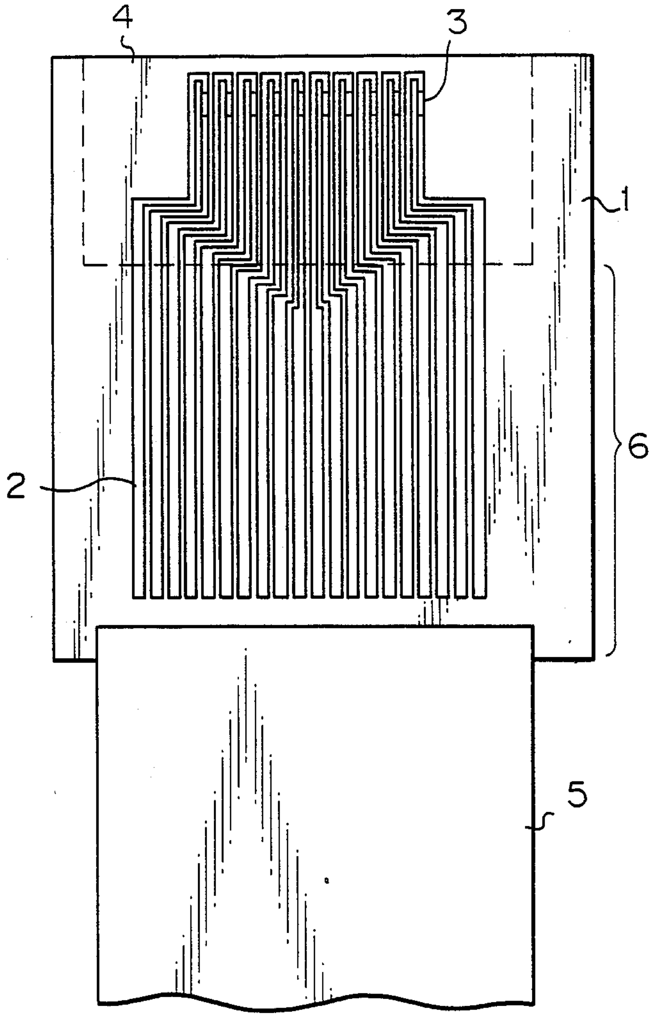
Fig. 1 PRIOR ART
FIG. 1 is a plan view of a prior art liquid jet recording head.

As schematically depicted in FIG. 5(*a*), a recording head unit like those shown in FIGS. 5 and 6 is connected to an external circuit (comparable to the flexible circuit board 5 shown in FIG. 1) in a recording apparatus, when the recording head unit is mechanically and electrically connected to the apparatus by the external connection electrode members 46.

Figure 7:
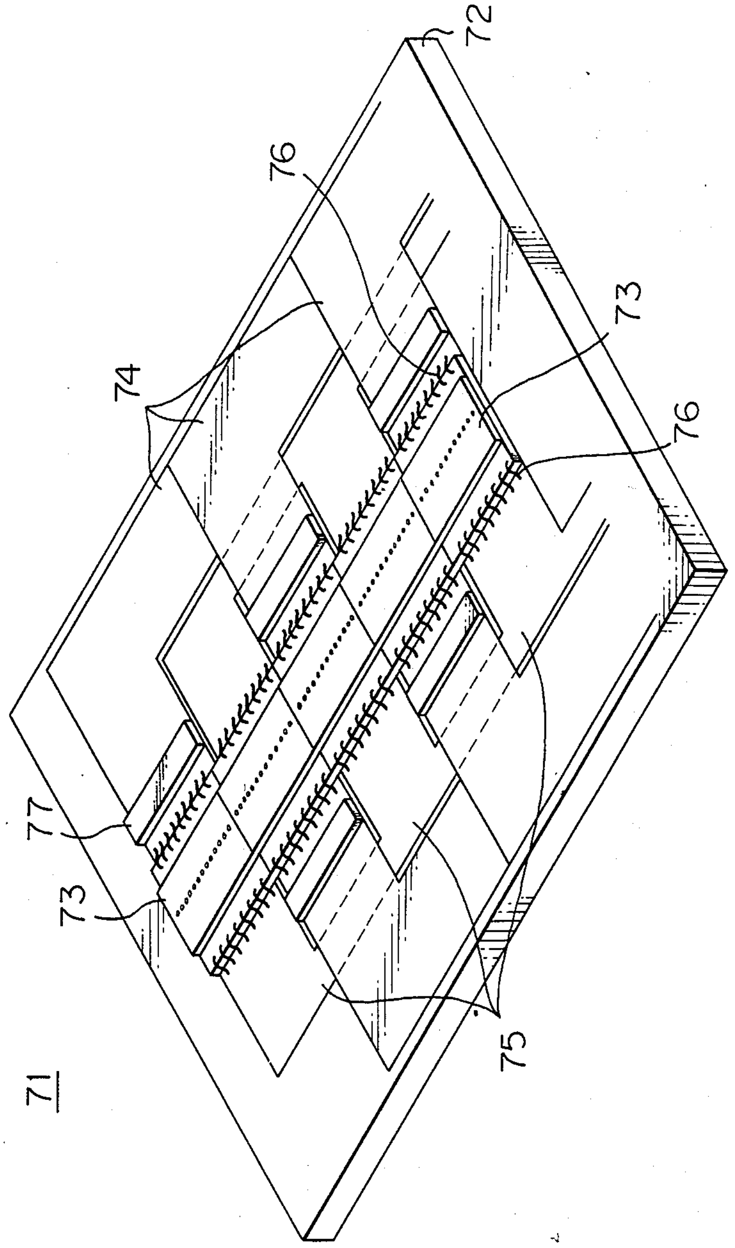
FIG. 7 is a perspective view of other embodiment of the recording head unit of the present invention.

The present invention is applicable not only to a small liquid jet recording head unit used in a serial type printer but also to a full-multiple liquid jet recording head unit used in a line printer shown in FIG. 7.

In FIG. 7, numeral 71 denotes a recording head assembly having a plurality of recording heads 73 of the present invention parallelly arranged on a substrate 72 with common electrodes 75 and individual electrodes 74 being electrically connected by bonding wires 76. Numeral 77 denotes rectifier arrays for keeping the drive currents to the individual electrodes in one direction. The individual electrodes of the recording head assembly are overlapped to keep it compact, although they need not be overlapped.

The wiring may be done by a multi-layer wiring board for the purpose of compaction. The individual electrodes may be a separate member such as a flexible printed circuit board.

As described hereinabove in accordance with the present invention, the cost of the expensive substrate material is reduced and a number of substrates can be formed in a batch process. Accordingly, a facility cost, a material cost and a personnel cost are significantly reduced and an inexpensive recording head is provided.

Since the single substrate can be applied to various types of products, the process is unified and simplified, and mass-productivity and a manufacturing yield are improved.

Since no unnecessary wiring area is included, the reliability of the recording head is improved.

We claim:

1. A liquid jet recording head unit comprising:

a recording head for discharging liquid from an orifice by the action of energy generated by energy generating means provided on a substrate and connected to electrode means on said substrate for supplying an electrical signal to said energy generating means; and a support member having thereon electrode means for supplying an electrical signal to said electrode means on said substrate and a plurality of connectors electrically connected to said electrode means on said support member and projecting from said support member for electrically and mechanically connecting the recording head unit with a recording apparatus, wherein said electrode means on said substrate and said electrode means on said support member are electrically connected to each other and said substrate is mechanically connected to said support member.

2. A liquid jet recording head unit according to claim 1, wherein said energy generating means includes an electro-thermal conversion member.

3. A liquid jet recording head unit according to claim 1, wherein said support member is selected from an inorganic insulative material and a material formed by coating an insulative material on a surface of a conductive material.

4. A liquid jet recording head unit according to claim 1, wherein:

said electrode means on said substrate includes a plurality of substrate electrodes;

said electrode means on said support member includes a plurality of support member electrodes electrically connected to selected ones of said substrate electrodes; and each of said connectors is electrically connected to one of said support member electrodes.

5. A liquid jet recording head unit according to claim 1, wherein said orifice is disposed such that the liquid are discharged therefrom in a direction substantially parallel to the direction in which liquid is supplied to said energy generating means.

6. A liquid jet recording head unit according to claim 1, wherein said orifice is disposed such that the liquid are discharged therefrom in a direction substantially perpendicular to the direction in which liquid is supplied to said energy generating means.

7. A liquid jet recording head unit according to claim 1, wherein a plurality of orifices are provided.

8. A method of manufacturing a liquid jet recording head unit, comprising the steps of:

forming a first substrate on which a plurality of energy generating members are provided, said energy generating members being suitable for generating energy for discharging liquid from a discharge orifice;

forming a second substrate having a predetermined number of said energy generating members by dividing said first substrate;

forming a recording head by constructing on said second substrate discharge orifices corresponding to said energy generating members on said second substrate and a liquid supplying unit for supplying liquid past an energy generating portion of each said energy generating member to said corresponding discharge orifice; and mounting said recording head on a support member having a plurality of connectors projecting from said support member for electrical and mechanical connection to a recording apparatus and electrodes electrically connected to said connectors for supplying electrical signals to said energy generating members.

9. A method according to claim 8, wherein each said energy generating member includes an electro-thermal conversion member.

10. A method according to claim 8, wherein said division of said first substrate is performed by apparatus selected from a dicing saw, diamond cutter, scribing machine and laser beam cutter.

11. A liquid jet recording head unit comprising:

a recording head unit for discharging liquid from an orifice by the action of energy generated by an energy generating member provided on a substrate and connected to an electrode on said substrate; and a support member having thereon an electrode for supplying an electrical signal to said energy generating member and a connector electrically connected to said electrode on said support member for electrically and mechanically connecting the recording head unit with a recording apparatus, wherein said electrode on said substrate and said electrode on said support member are electrically connected to each other by a connecting electrode, said substrate is mechanically connected to said support member and at least said connecting electrode is sealed with a resin.

12. A liquid jet recording head unit according to claim 11, wherein said energy generating member includes electro-thermal conversion member.

13. A liquid jet recording head unit according to claim 11, wherein said support member is selected from an inorganic insulative material and a material formed by coating an insulative material on a surface of a conductive material.

14. A liquid jet recording head unit according to claim 11, wherein said resin is selected from epoxy resin, phenol resin and silicone resin.

15. A liquid jet recording head unit according to claim 11, said connector projects from said support member.

16. A liquid jet recording head unit according to claim 11, wherein said orifice is disposed such that the liquid are discharged therefrom in a direction substantially parallel to the direction in which liquid is supplied to said energy generating means.

17. A liquid jet recording head unit according to claim 11, wherein said orifice is disposed such that the liquid are discharged therefrom in a direction substantially perpendicular to the direction in which liquid is supplied to said energy generating means.

18. A liquid jet recording head unit according to claim 11, wherein a plurality of orifices are provided.

19. A method of manufacturing a liquid jet recording head unit, comprising the steps of:

forming a first substrate on which a plurality of energy generating members are provided, said energy generating members being suitable for generating energy for discharging liquid from a discharge orifice;

forming a second substrate having a predetermined number of said energy generating members by dividing said first substrate;

forming a recording head by constructing on a second substrate discharge orifices corresponding to said energy generating members on said second substrate and a liquid supplying unit for supplying liquid past an energy generating portion of each of said energy generating member to said corresponding discharge orifice;

mounting said recording head unit on a support member having a connector provided for electrical and mechanical connection to a recording apparatus and connecting electrode means for electrically connecting electrodes on said second substrate, which are electrically connected to said energy generating members, to electrode means on said support member, which is electrically connected to said connector; and sealing at least said connecting electrode means with a resin.

20. A method according to claim 19, wherein each said energy generating member includes an electrothermal conversion member.

21. A method according to claim 19, wherein said division of said first substrate is performed by apparatus selected from a dicing saw, diamond cutter, scribing machine and laser beam cutter.

22. A method according to claim 19, wherein said resin is selected from epoxy resin, phenol resin and silicone resin.

23. A method according to claim 19, wherein said connector projects from said support member.

24. A liquid jet recording apparatus comprising:

a recording head unit including (a) a recording head for discharging liquid from an orifice by the action of energy generated by energy generating means provided on a substrate and connected to electrode means on said substrate for supplying an electrical signal to said energy generating means and (b) a support member having thereon electrode means for supplying an electrical signal to said electrode means on said substrate and a plurality of connectors electrically connected to said electrode means on said support member and projecting from said support member for electrically and mechanically connecting said recording head unit with the recording apparatus, wherein said electrode means on said substrate and said electrode means on said support member are electrically connected to each other and said substrate is mechanically connected to said support member; and an external circuit disposed in the recording apparatus for electrical connection to said connectors.

25. A liquid jet recording head apparatus comprising:

a recording head unit including (a) a recording head for discharging liquid from an orifice by the action of energy generated by an energy generating member provided on a substrate and connected to an electrode on said substrate and (2) a support member having thereon an electrode for supplying an electrical signal to said energy generating member and a connector electrically connected to said electrode on said support member for electrically and mechanically connecting said recording head unit with the recording apparatus, wherein said electrode on said substrate and said electrode on said support member are electrically connected to each other by a connecting electrode, said substrate is mechanically connected to said support member and at least said connecting electrode is sealed with a resin; and an external circuit disposed in the recording apparatus for electrical connection to said connector.

* * * * *

UNITED STATES PATENT AND TRADEMARK OFFICE
CERTIFICATE OF CORRECTION

PATENT NO. : 4,922,269

DATED : May 1, 1990

INVENTOR(S) : MASAMI IKEDA, ET AL.

It is certified that error appears in the above-identified patent and that said Letters Patent is hereby corrected as shown below:

COLUMN 1

Line 22, "been" should be deleted.

COLUMN 2

Line 42, "freedom of" should read --freedom--.
Line 61, "of" should be deleted.

COLUMN 4

Line 1, "almina" should read --alumina--.
Line 12, "circuit" should read --circuit,--.

COLUMN 6

Line 5, "are" should read --is--.
Line 10, "are" should read --is--.
Line 47, "recording head unit" should read --recording head--.
Line 66, "electro-thermal" should read --an electro-thermal--.

COLUMN 7

Line 9, "claim 11, said" should read --claim 11, wherein said--.
Line 13, "are" should read --is--.
Line 19, "are" should read --is--.
Line 35, "a sec-" should read --said sec- --.
Line 39, "each of" should read --each--.
Line 43, "recording head unit" should read --recording head--.

UNITED STATES PATENT AND TRADEMARK OFFICE
CERTIFICATE OF CORRECTION

PATENT NO. : 4,922,269

DATED : May 1, 1990

INVENTOR(S) : MASAMI IKEDA, ET AL.

It is certified that error appears in the above-identified patent and that said Letters Patent is hereby corrected as shown below:

COLUMN 8

Line 34, "liquid jet recording head apparatus" should read --liquid jet recording apparatus--.
Line 39, "(2)" should read --(b)--.

Signed and Sealed this

Fifteenth Day of October, 1991

*Attest:*

HARRY F. MANBECK, JR.

*Attesting Officer*

*Commissioner of Patents and Trademarks*